(12) United States Patent
Berens et al.

(10) Patent No.: US 9,638,253 B2
(45) Date of Patent: May 2, 2017

(54) BEARING

(71) Applicants: Frank Berens, Saunay (FR); Laurent Varnoux, Saint Avertin (FR); Xiaobo Zhou, Houten (NL)

(72) Inventors: Frank Berens, Saunay (FR); Laurent Varnoux, Saint Avertin (FR); Xiaobo Zhou, Houten (NL)

(73) Assignee: AKTIEBOLAGET SKF, Gothenburg (SE)

(*) Notice: Subject to any disclaimer, the term of this patent is extended or adjusted under 35 U.S.C. 154(b) by 0 days.

(21) Appl. No.: 14/830,871

(22) Filed: Aug. 20, 2015

(65) Prior Publication Data

US 2016/0061264 A1   Mar. 3, 2016

(30) Foreign Application Priority Data

Aug. 28, 2014 (GB) .................................. 1415195.5

(51) Int. Cl.
*F16C 19/00* (2006.01)
*F16C 33/78* (2006.01)
*F16C 33/66* (2006.01)
*F16C 33/82* (2006.01)
(Continued)

(52) U.S. Cl.
CPC ........ *F16C 33/7846* (2013.01); *F16C 33/585* (2013.01); *F16C 33/6614* (2013.01); *F16C 33/785* (2013.01); *F16C 33/7823* (2013.01); *F16C 33/7826* (2013.01); *F16C 33/7863* (2013.01); *F16C 33/7889* (2013.01); *F16C 33/82* (2013.01); *F16C 19/163* (2013.01);
(Continued)

(58) Field of Classification Search
CPC .............. F16C 33/6603; F16C 33/7803; F16C 33/7806; F16C 33/7809; F16C 33/7813; F16C 33/782; F16C 33/7826; F16C 33/784; F16C 33/7843; F16C 33/7846; F16C 33/785
See application file for complete search history.

(56) References Cited

U.S. PATENT DOCUMENTS

| 6,179,472 B1* | 1/2001 | Gilliland ................. F16C 33/80 384/477 |
| 6,490,137 B1* | 12/2002 | Toyota .................... F16C 33/62 360/135 |
| 7,547,466 B2* | 6/2009 | Misu ....................... F16C 33/74 384/93 |

FOREIGN PATENT DOCUMENTS

| CN | 201193650 Y | 2/2009 |
| EP | 1239173 A2 | 9/2002 |

(Continued)

*Primary Examiner* — James Pilkington
(74) *Attorney, Agent, or Firm* — Bryan Peckjian; SKF USA Inc. Patent Dept.

(57) ABSTRACT

A rolling element bearing comprising inner and outer rings; a plurality of rolling elements disposed between opposing surfaces of the inner and outer rings; and a bearing shield comprising a first member having an annular surface facing the plurality of rolling elements, the first member either (1) extending from the inner ring towards the outer ring (defining a gap between the first member and the outer ring) and the inner ring having a low surface energy surface adjacent the gap, or (2) extending from the outer ring towards the inner ring (defining a gap between the first member and the inner ring) and the inner ring comprises a low energy surface adjacent the gap. The low energy surfaces each have a surface energy of ≤0.028 N/m.

7 Claims, 3 Drawing Sheets

(51) Int. Cl.
*F16C 33/58* (2006.01)
*F16C 19/16* (2006.01)

(52) U.S. Cl.
CPC ...... *F16C 2202/30* (2013.01); *F16C 2223/40* (2013.01); *F16C 2223/42* (2013.01)

(56) References Cited

FOREIGN PATENT DOCUMENTS

| | | |
|---|---|---|
| JP | 2005233249 A | 9/2005 |
| JP | 2009180244 A | 8/2009 |

* cited by examiner

BEARING

CROSS REFERENCE TO RELATED APPLICATIONS

This is a Non-Provisional patent application, filed under the Paris Convention, claiming the benefit of Great Britain (GB) Patent Application Number 1415195.5, filed on 28 Aug. 2014, which is incorporated herein by reference in its entirety.

TECHNICAL FIELD

The present invention relates generally to the field of bearings and, in particular, to an improved bearing comprising a non-contact bearing closure. The non-contact bearing closure prevents lubricant leakage and contamination, while exhibiting low levels of sealing friction.

BACKGROUND

Bearings are devices that permit constrained relative motion between two parts. A rolling element bearing, sometimes referred to as a rolling bearing, is a bearing which carries a load by placing rolling elements, such as rollers or balls, between two bearing rings. The rolling elements are typically lubricated with grease. A particularly common type of rolling element bearing is a ball bearing. A ball bearing has inner and outer rings between which balls roll. The rings typically feature a groove (also known as a race or raceway) which is usually shaped so that the balls fit slightly loosely in the grooved ring.

Bearing closures serve to exclude contamination, contain lubricants and protect the bearing from internal damage whilst being handled. Bearing closures are available in two basic types: contact bearing closures (often referred to as "seals") and non-contact bearing closures (often referred to as "shields"). Bearing closures are typically attached to the outer ring of a bearing. Contact bearing closures typically contact both the inner and outer rings. While such an arrangement is effective at reducing contamination and lubricant loss, the contact of the bearing closure with both rings increases the torque and reduces the maximum speed capability of the bearing. In contrast, non-contact bearing closures do not contact the inner ring. There is therefore a gap between the non-contact bearing closures and the inner ring. While such an arrangement leads to reduced torque, the protection against contamination and lubricant loss may be reduced. Lubricant and/or contaminants may leak through the gaps between the non-contact bearing closure and the inner ring by surface wetting. This leakage is enhanced by a dynamic pumping effect of the bearing. While the dynamic pumping effect can be reduced by reducing the size of the gap, this may enhance leakage via the capillary effect. In addition, reducing the size of the gap is limited by the need to avoid contact between the non-contact bearing closure and the inner ring. Accordingly, there is a need for a bearing closure which exhibits low levels of torque together with high protection against contamination and lubricant loss.

The present invention seeks to tackle at least some of the problems associated with the prior art or at least to provide a commercially acceptable alternative solution thereto.

SUMMARY OF THE INVENTION

In a first aspect, the present invention provides a rolling element bearing comprising:

an inner ring;
an outer ring;
a plurality of rolling elements disposed between an outer surface of the inner ring and an inner surface of the outer ring; and
a bearing shield comprising a first member having an annular surface that faces the plurality of rolling elements, the first member either extending from the inner ring towards the outer ring to define a gap between the first member and the outer ring, or extending from the outer ring towards the inner ring to define a gap between the first member and the inner ring,
wherein:
the first member has a low surface energy surface adjacent the gap;
when the first member extends from the inner ring, the outer ring has a low surface energy surface adjacent the gap;
when the first member extends from the outer ring, the inner ring has a low surface energy surface adjacent the gap; and
the low surface energy surfaces each have a surface energy of ≤0.028 N/m.

Each aspect or embodiment as defined herein may be combined with any other aspect(s) or embodiment(s) unless clearly indicated to the contrary. In particular, any features indicated as being preferred or advantageous may be combined with any other feature indicated as being preferred or advantageous.

The inventors have surprisingly found that the rolling element bearing of the present invention exhibits a combination of low torque (and therefore a high maximum speed capability) together with low levels of lubricant loss from the bearing and low levels of contamination into the bearing.

The rolling element bearing comprises an inner ring, an outer ring and a plurality of rolling elements therebetween. The inner ring typically sits concentrically within the outer ring. The bearing further comprises a bearing shield, which is a structure for hindering egress of lubricant and/or ingress of foreign bodies.

Prior to use, the bearing is loaded with a lubricant, typically grease, to lubricate the relative motion of the rolling elements with the outer surface of the inner ring and the inner surface of the outer ring.

The bearing shield comprises a first member having an annular surface that faces the plurality of rolling elements. The first member may extend from the inner ring towards the outer ring to define a gap between the first member and the outer ring. Alternatively, the first member may extend from the outer ring towards the inner ring to define a gap between the first member and the inner ring.

The first member has a low surface energy surface on a portion thereof adjacent the gap between the first member and the outer ring or the gap between the first member and the inner ring. For example, a low surface energy coating may cover the edge of the bearing shield that is adjacent the outer ring or the inner ring. The low surface energy surface may extend from the edge to a portion of the annular surface that faces the plurality of rolling elements. The low surface energy surface may substantially form the entire annular surface of the bearing shield.

When the first member extends from the inner ring, the outer ring has a low surface energy surface adjacent the gap between the first member and the outer ring. For example, the inner surface of the outer ring may have a low surface energy surface that extends axially from a point aligned with the inner extent of the bearing shield to a point aligned with the outer extend of the bearing shield. The low surface energy surface may extend axially beyond the point aligned with the inner extent of the bearing shield and beyond the point aligned with the outer extend of the bearing shield. The low surface energy surface will typically comprise a low surface energy coating on the outer ring adjacent the gap between the first member and the outer ring.

When the first member extends from the outer ring, the inner ring has a low surface energy surface adjacent the gap between the first member and the inner ring. For example, the outer surface of the inner ring may have a low surface energy surface that extends axially from a point aligned with the inner extent of the bearing shield to a point aligned with the outer extend of the bearing shield. The low surface energy surface may extend axially beyond the point aligned with the inner extent of the bearing shield and beyond the point aligned with the outer extend of the bearing shield. The low surface energy surface will typically comprise a low surface energy coating on the inner ring adjacent the gap between the first member and the inner ring.

Without being bound by theory, in use, the low energy surfaces may act as a barrier and may inhibit movement of liquids into and out of the bearing. When fitted to the outer ring of a rolling element bearing, for example, the gap between the non-contact bearing closure and the inner ring may be reduced to suppress leakage of lubricant caused by the dynamic effect without enhancing leakage of lubricant caused by the capillary effect.

Lubricant loss from a bearing may result in an increase in the bearing temperature, and ultimately bearing failure. The ingress of contaminants (such as, for example, water) into a bearing may result in corrosion of the bearing components and/or reduce the lubricating properties of a lubricant loaded into the bearing. Accordingly, the bearing of the present invention may exhibit an improved working lifetime. The bearing of the present invention may exhibit a working lifetime comparable to that of a bearing fitted with a bearing seal (i.e. contact bearing closure). However, in comparison to conventional bearings comprising a bearing seal, such an increase in working lifetime is provided without a corresponding unfavourable increase in bearing torque.

In view of the reduced lubricant leakage, the bearing of the present invention may be loaded with a reduced amount of lubricant. For example, up to 90% less lubricant than a conventional bearing fitted with a bearing shield.

One or both of the inner and outer rings of the bearing will typically be formed of a bearing steel. Examples of bearing steels include: through-hardened carbon chromium steel (100Cr6) containing approximately 1% carbon and 1.5% chromium according to ISO 683-17:1999; chromium-nickel and manganese-chromium alloyed steels according to ISO 683-17:1999 with a carbon content of approximately 0.15%; high chromium content steels X65Cr14 according to ISO 683-17:1999 and X105CrMo17 according to EN 10088-1:1995; and highly alloyed steels such as 80MoCrV42-16 manufactured to ISO 683-17:1999.

The rolling elements may comprise, for example, balls, rollers, discs and/or tapered rolling elements. These may be formed from, for example, a bearing steel as herein described or, alternatively, from a ceramic material such as silicon nitride.

The bearing shield preferably further comprises a second member having an annular surface that faces the plurality of rolling elements and that extends from the inner ring towards the outer ring to define a gap between the second member and the outer ring, or from the outer ring towards the inner ring to define a gap between the second member and the inner ring, the first and second members being located either side the rolling elements, and wherein:

the second member has a low surface energy surface adjacent the gap;

when the second member extends from the inner ring, the outer ring has a low surface energy surface adjacent the gap between the second member and the outer ring;

when the second member extends from the outer ring, the inner ring has a low surface energy surface adjacent the gap between the second member and the inner ring; and the low surface energy surfaces have a surface energy of ≤0.028 N/m.

The provision of both the first and second members helps to further reduce egress of lubricant and/or ingress of foreign bodies into the bearing.

The following discussion applies to a bearing shield comprising a first member or first and second members.

The bearing shield may be formed of any suitable material, for example, metal or alloys such as steel, a polymeric material and/or an elastomeric material.

Preferably, the first member, and if present the second member, extends from the outer ring towards the inner ring. In use, centrifugal forces may disperse lubricant towards the outer ring. Accordingly, if the gap is provided between the bearing shield and the inner ring, rather than between the bearing shield and the outer ring, lubricant loss through the gap may be reduced.

As noted above, the first member and the optional second member have a low surface energy surface (≤0.028 N/m) adjacent the gap between the bearing shield and inner or outer rings. In addition, preferably at least a portion of the annular surface of the first member and/or the second member (if present) has a low surface energy surface having a surface energy of ≤0.028 N/m. More preferably, the majority of the annular surface has a low surface energy surface. Still more preferably, substantially all of the annular surface may have a low surface energy surface. The low surface energy surface on the annular surface of the first member (and optionally also the second member) promotes re-flow of lubricant within the bearing, thereby serving to promote re-supply of lubricant to the contact surfaces. This may increase the lifetime of the bearing and/or enable a reduced amount of lubricant to be employed.

In a second aspect, the present invention provides a bearing comprising:

a support element having a bore;

a rotatable element rotatable within the bore; and a bearing shield comprising a first member having an annular surface that faces the bore, the first member either extending from the support element towards the rotatable element to define a gap between the first member and the rotatable element, or extending from the rotatable element towards the support element to define a gap between the first member and the support element, wherein:

the first member has a low surface energy surface adjacent the gap;

when the first member extends from the support element, the rotatable element has a low surface energy surface adjacent the gap;

when the first member extends from the rotatable element, the support element has a low surface energy surface adjacent the gap; and the low surface energy surfaces each have a surface energy of ≤0.028 N/m.

For example, the rotatable element could be a shaft or a collar around a shaft, and the support element could be a bush, or part of a housing. The bearing may be a plain bearing.

Similar to the first aspect, the inventors have surprisingly found that the rolling element bearing of the second aspect of the present invention exhibits a combination of low torque (and therefore a high maximum speed capability) together with low levels of lubricant loss from the bearing and low levels of contamination into the bearing.

The first member has a low surface energy surface on a portion thereof adjacent the gap between the first member and the rotatable element or the gap between the first member and the support element. For example, a low surface energy coating may cover the edge of the bearing shield that is adjacent the support element or the rotatable element. The low surface energy surface may extend from the edge to a portion of the annular surface that faces the bore. The low surface energy surface may substantially form the entire annular surface of the bearing shield.

When the first member extends from the rotatable element, the support element has a low surface energy surface adjacent the gap between the first member and the support element. For example, an inner surface of the support element may have a low surface energy surface that extends axially from a point aligned with the inner extent of the bearing shield to a point aligned with the outer extend of the bearing shield. The low surface energy surface may extend axially beyond the point aligned with the inner extent of the bearing shield and beyond the point aligned with the outer extend of the bearing shield. The low surface energy surface will typically comprise a low surface energy coating on the support element adjacent the gap between the first member and the support element.

When the first member extends from the support element, the rotatable element has a low surface energy surface adjacent the gap between the first member and the rotatable element. For example, the outer surface of the rotatable element may have a low surface energy surface that extends axially from a point aligned with the inner extent of the bearing shield to a point aligned with the outer extend of the bearing shield. The low surface energy surface may extend axially beyond the point aligned with the inner extent of the bearing shield and beyond the point aligned with the outer extend of the bearing shield. The low surface energy surface will typically comprise a low surface energy coating on the rotatable element adjacent the gap between the first member and the rotatable element.

Preferably, the bearing shield further comprises a second member having an annular surface that faces the bore and that extends from the support element towards the rotatable element to define a gap between the second member and the rotatable element, or from the rotatable element towards the support element to define a gap between the second member and the support element, the first and second members located either side of the bore, and wherein:
  the second member has a low surface energy surface adjacent the gap;
  when the second member extends from the support element, the rotatable element has a low surface energy surface adjacent the gap between the second member and the rotatable element;
  when the second member extends from the rotatable element, the support element has a low surface energy surface adjacent the gap between the second member and the support element; and
  the low surface energy surfaces have a surface energy of $\leq 0.028$ N/m.

Preferably, the first member, and if present the second member, extends from the support element towards the rotatable element. In use, centrifugal forces may disperse lubricant towards the support element. Accordingly, if the gap is provided between the bearing shield and the rotatable element, rather than between the bearing shield and the support element, lubricant loss through the gap may be reduced.

As noted above, the first member and the optional second member have a low surface energy surface ($\leq 0.028$ N/m) adjacent the gap between the bearing shield and rotatable element or the support element. In addition, preferably at least a portion of the annular surface of the first member and/or the second member (if present) has a low surface energy surface having a surface energy of $\leq 0.028$ N/m. More preferably, the majority of the annular surface has a low surface energy surface. Still more preferably, substantially all of the annular surface may have a low surface energy surface. The low surface energy surface on the annular surface of the first member (and optionally also the second member) promotes re-flow of lubricant within the bearing, thereby serving to promote re-supply of lubricant to the contact surfaces. This may increase the lifetime of the bearing and/or enable a reduced amount of lubricant to be employed.

The features discussed in the following apply equally to both the first and second aspects of the present invention.

The following discussion of low surface energy surfaces applies to the first member of the bearing shield, the optional second member of the bearing shield, the inner ring and the outer ring, or, in the case of the second aspect, the rotatable element and the support element. The low surface energy surfaces have a surface energy of $\leq 0.028$ N/m. The low surface energy surfaces may have the same surface energy. Alternatively, one or more of the low surface energy surfaces may have different surface energies. Preferably, one or more of the low surface energy surfaces has a surface energy of $\leq 0.020$ N/m, more preferably $\leq 0.015$ N/m. The lower limit of the surface energy will typically be $\geq 0.005$ N/m, more typically $\geq 0.010$ N/m. The surface energy may be determined by conventional techniques such as by drop shape analysis, for example. Drop shape analysis (DSA) is an image analysis method for determining the contact angle from the shadow image of a sessile drop and the surface or interfacial tension from the shadow image of a pendant drop. The surface tension is calculated with the help of a Young-Laplace fit to the contour of a pendant drop determined by image analysis. The image scale and the difference in density between drop phase and bulk phase are known.

One or more of the low surface energy surfaces preferably comprises a fluoropolymer such as a fluorocarbon and/or silicon. Such materials have favourably low surface energies. In addition, such materials are low cost and durable. Such materials may be present as a coating on the first member (and optional also the second member, if present) and either the inner ring or outer ring, or, in the case of the second aspect, either the rotatable element or the support element. Alternatively, the bearing shield may be formed entirely of such materials.

More specifically, the low surface energy surface preferably comprises a fluorocarbon having CF2 and CF3 functional groups on the surface thereof. Such functional groups may serve to reduce the surface energy to particularly favourable levels. The ratio of CF2 to CF3 functional groups on the annular surface of the first member (and optionally also the second member) is preferably from 10:1 to 1:10, more preferably from 3:1 to 1:1. Such ratios serve to reduce the surface energy to particularly favourable levels.

When the low surface energy surface is in the form of a coating, such coatings may be applied using a sol-gel dip process. After dip coating the surface of the bearing shield and/or inner ring and/or outer ring in the low-friction coating composition, a curing process may be carried out, for example at a temperature of from 50 to 340° C., and more typically from 80 to 130° C. Alternatively, the coating may be applied using a plasma process. The use of a plasma process avoids the need for a curing process.

The coating may coat only the annular surface of the first member of the bearing shield. Alternatively, the coating may coat the entire surface of the first member of the bearing shield. These alternatives apply equally to the coating of the second member, if present.

As described above, the low surface energy surfaces may be provided by means of a coating. In this case, the coating preferably has a thickness of from 0.01 to 10 μm, more preferably from 0.1 to 1 μm. Thinner coatings may exhibit an unfavourably short lifetime. Thicker coatings may contact one or more of the inner ring, outer ring and rolling elements, thereby increasing the friction of the bearing.

As noted above, in a preferred embodiment, the annular surface of the first member (and optionally also the second member) comprises a fluoropolymer and/or silicone. For example, fluoropolymers such as poly[4,5-difluoro-2,2-bis (trifluoromethyl)-1,3-dioxole-co-tetrafluoroethylene] may be used in the present invention. Perfluoroalkoxy polymers and copolymer resins may also be used. These materials may also form the low surface energy surface on the inner ring or outer ring on the portion of the ring adjacent the gap between the ring and the first member and optional second member. Similarly, these materials may also form the low surface energy surface on the rotatable element or the support element in relation to the second aspect of the present invention.

Specific examples of fluoropolymers for use in the present invention include Dupont Teflon® AF1600, Dupont PFA, Dupont Teflon® PFA, DuPont Teflon® PFAD 335D and 3M EGC 2702.

The first member of the bearing closure may be annular in shape. Alternatively, the first member may be, for example, in the shape of a disk or hemisphere. These alternatives apply equally to the second member, if present.

The bearing may be loaded with a lubricant, preferably grease, to lubricate either:
  the relative motion of the rolling elements with the outer surface of the inner ring and the inner surface of the outer ring; or
  the relative motion of the support element and the rotatable element.

The term "grease" as used herein encompasses a semi-solid lubricant, which consists of a soap emulsified with mineral oil or vegetable oil. The characteristic feature of greases is that they possess a high initial viscosity, which upon the application of shear, drops to give the effect of an oil-lubricated bearing of approximately the same viscosity as the base oil used in the grease. The rolling elements may be at least partially coated with the lubricant.

In a preferred embodiment, the bearing is a deep groove ball bearing (DGBB). Such bearings may be particularly prone to lubricant loss and/or impurity ingress when fitted with a bearing shield.

BRIEF DESCRIPTION OF THE DRAWINGS

The present invention will now be described further, by way of example, with reference to the following non-limiting drawings in which.

DETAILED DESCRIPTION OF THE INVENTION

Figure 1:
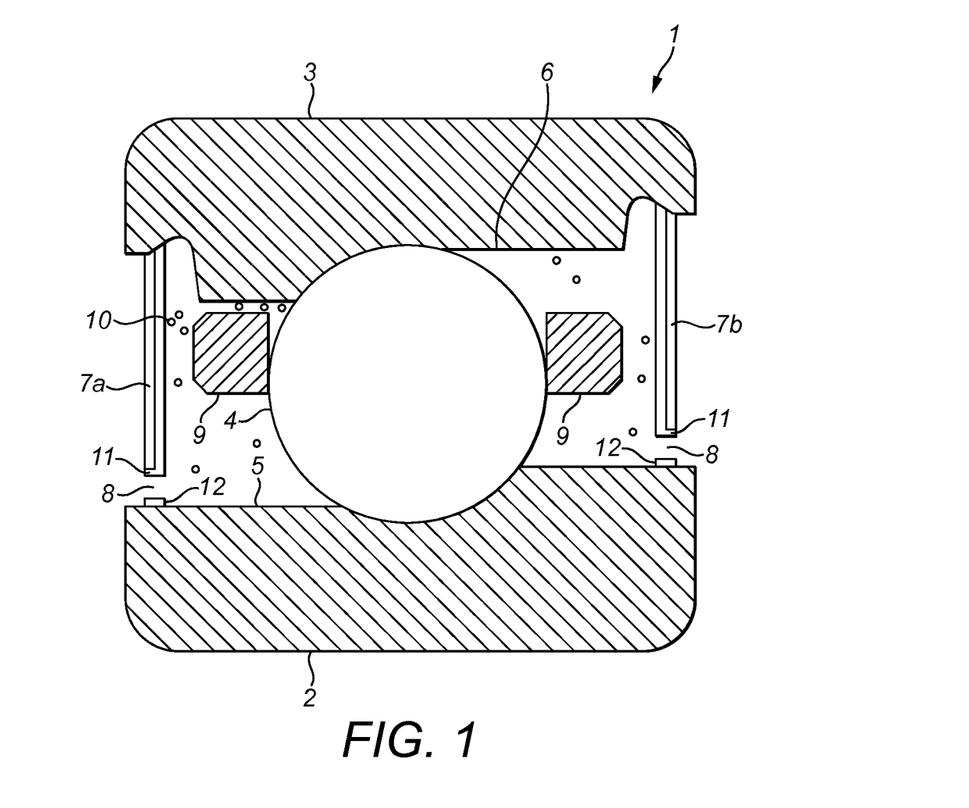
FIG. 1 shows a cross-sectional view of part of an embodiment of a bearing according to the present invention.

In one embodiment, shown in FIG. 1, a bearing 1 according to the present invention is shown comprising an inner ring 2, an outer ring 3 and a plurality of rolling elements 4 (in this case a ball, only one rolling element shown) disposed between an outer surface 5 of the inner ring 2 and an inner surface 6 of the outer ring 3. Bearing shield 7a, 7b is attached to the outer ring 3 and extends towards the inner ring 2, but does not contact the inner ring resulting in a gap 8 therebetween. The bearing shield 7a, 7b comprises first and second annular members 7a and 7b, which are shown generally as planar (although this is not essential). The rolling elements 4 are preferably contained in a ball cage 9, and the bearing is loaded with grease 10 (shown as circles).

The first and second annular members 7a, 7b are located either side of the rolling elements 4 in the axial direction. In this way, first and second annular members 7a, 7b, the outer surface 5 of the inner ring 2 and the inner surface 6 of the outer ring 3 collectively define a cavity within which grease 10 is retained. The cavity is open to external space via the gaps 8 between each annular member 7a, 7b and the inner ring 2.

While not shown in the accompanying Figures, it is possible for the bearing shield to be attached to the inner ring 2 and to extend towards the outer ring 3 but to not contact it, resulting in a gap between each annular member and the outer ring 3.

A coating 11 having a surface energy of ≤0.028 N/m is applied to at least the edges of annular members 7a, 7b adjacent the gap 8. That is, when extending from the outer ring 3 towards the inner ring 2 (without contacting the inner ring 2), the coating 11 is applied to at least the radially innermost edge of the annular members 7a, 7b. On the other hand, for the case (not shown) where the bearing shield extends towards the outer ring 3 from the inner ring 2 (without contacting the outer ring 3), the coating 11 is applied to at least the radially outermost edge of the annular members.

In addition, the coating 11 preferably also substantially covers the inward facing surfaces of the annular members 7a, 7b. That is, the surfaces that face the rolling elements 4. In use, the coating 11 on the inward facing surfaces promotes re-flow of the grease 10 to the contact surfaces of the rolling element 4 with the outer surface 5 and inner surface 6. In an alternative arrangement (not shown), the coating 11 may (alternatively or in combination) substantially cover the outward facing surface of the annular members 7a, 7b.

A coating 12 having a surface energy of ≤0.028 N/m is applied to the inner ring 2. In the alternative arrangement (not shown), in which the bearing closure contacts the inner ring 2 and extends towards the outer ring 3 (without contacting the outer ring 3), the coating 12 having a surface energy of ≤0.028 N/m is applied to the outer ring 3.

The coating 12 is applied to at least the portion of the inner or outer ring 2, 3 adjacent the gap. The coating 12 may only cover the portion of the inner or outer ring 2, 3 adjacent the gap, which will typically oppose the corresponding coating 11 provided on the radially innermost edges of annular members 7a, 7b (as shown in FIG. 1). Alternatively, the coating 12 may extend inwards as far as the raceway (not shown). Alternatively, the coating 12 may extend even further and may cover the raceway (not shown).

In use, it is thought that the low surface energy coating 11 may inhibit wetting of the bearing shield 7a, 7b. Likewise, it is thought that the low surface energy coating 12 may inhibit wetting of the inner ring 2. This suppresses leakage of lubricant 10 from the bearing 1 and ingress of contaminants (not shown) into the bearing 1.

The low surface energy coating 11 and/or low surface energy coating 12 preferably comprise a fluoropolymer such as a fluorocarbon and/or a silicone.

While the bearings 1 shown in FIG. 1 is asymmetric (for reasons of ease of assembly), this is not essential, and the invention may be applied to other types of bearing 1, including symmetric and/or split types, etc.

Whilst the description above is given for the preferred form of bearing, a rolling element bearing, other forms of bearing are considered. For example, a plain bearing according to the present invention may comprise a static element, and a rotating element. In such an example, the rotating element may be a shaft supported in a bush, which forms the static element, however it will be appreciated that the shaft may be static with the bush rotating there-about. A bearing shield of the type discussed above can be attached to the bush and extends towards the rotating shaft, but does not contact the shaft, resulting in a gap therebetween. As with the preceding embodiments, the bearing shield may, alternatively, extend towards the bush from the rotating shaft. As with the preceding embodiments, the bearing shield or the element to which it extends may have a low surface energy (provided by a coating or by the material itself). Furthermore, the element to which the bearing shield extends may also have a low surface energy (provided by a coating or by the material itself). Thus, the same principle of lubricant retention is applicable to a bearing of a different structure.

The invention will now be described further in relation to the following non-limiting examples.

EXAMPLE 1

A number of bearings were prepared having a bearing shield attached to a support element. The bearings were each loaded with grease. The following features were varied: (i) type of grease, (ii) presence or absence of low surface energy coating on radially innermost edge of the bearing shield, (iii) presence or absence of a low surface energy coating on the outer surface of a bearing shaft opposite the bearing shield, and (iv) the type of low surface energy coating.

The bearings were tested under dynamic conditions using a Pearl IV rig to determine the levels of grease loss. The test conditions were as follows:
6312 shield
Speed 120 rpm, at room temperature
Test duration: 5 minutes
Shield inner diameter: 82.39 mm
Shaft outer diameter: 81.94 mm
Shield gap: 0.225 mm
Coated shield: EGC 2702 (layer thickness 0.5 μm), PFAD 335D (layer thickness 5 μm)
Coated sapphire shaft. EGC 2702 (layer thickness 0.5 μm)
Lubricant: MT33 grease (the standard grease for deep groove ball bearings), Nerita HV grease (the standard grease for railway passenger trains), Shell TT 100 base oil The types of coating are described in Tables 1 and 2 below.

TABLE 1

Properties of oleophobic coatings.

| Coating | Supplier | Solvent | Solid content | Curing process | Coating thickness (□m) |
|---|---|---|---|---|---|
| EGC 2702 | 3M | Nevec 720 | 2 wt % | 100° C., 30 min | 0.2-0.5 |
| PFAD 335D | Dupont | Water | 60 wt. % | 120° C., 3 min 260° C., 3 min 340° C., 10 min | 5-10 |

TABLE 2

Properties of oleophobic coatings.

| | Surface energy (mJ/m$^2$) | | | Contact angle (deg) | |
|---|---|---|---|---|---|
| Coating name | Polar | Dispersive | Total | Water | T68 Oil |
| EGC 2702 | 1.5 | 11.5 | 13 | 111 | 80 |
| PFAD 335D | — | — | 10 | 131 | 89 |

Figure 2:
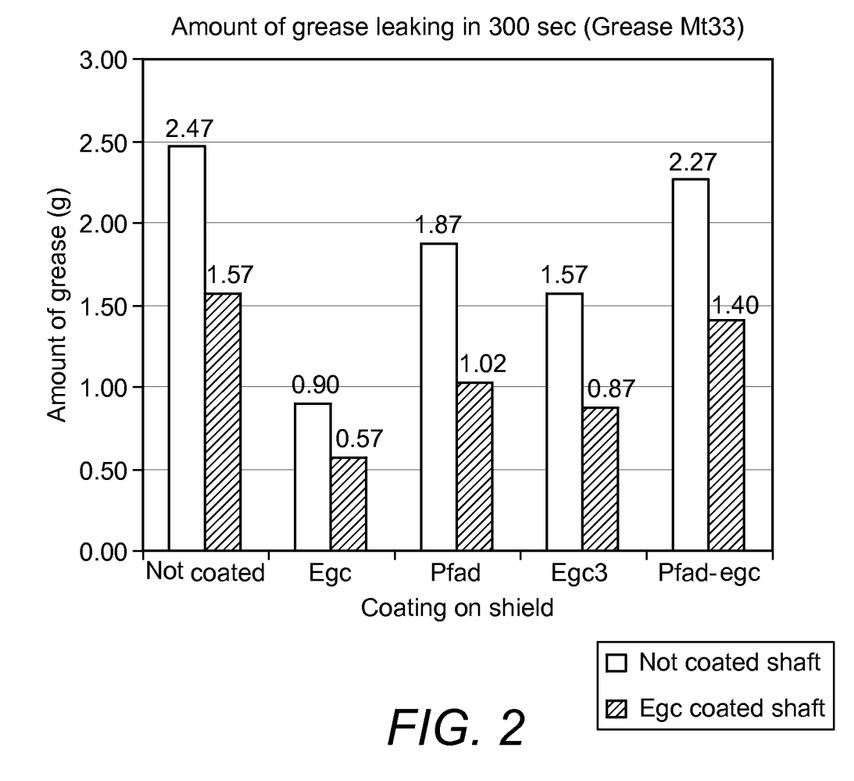
FIG. 2 shows a plot of grease leakage for bearings according to the present invention and also rolling element bearings according to comparative examples.
Figure 3:
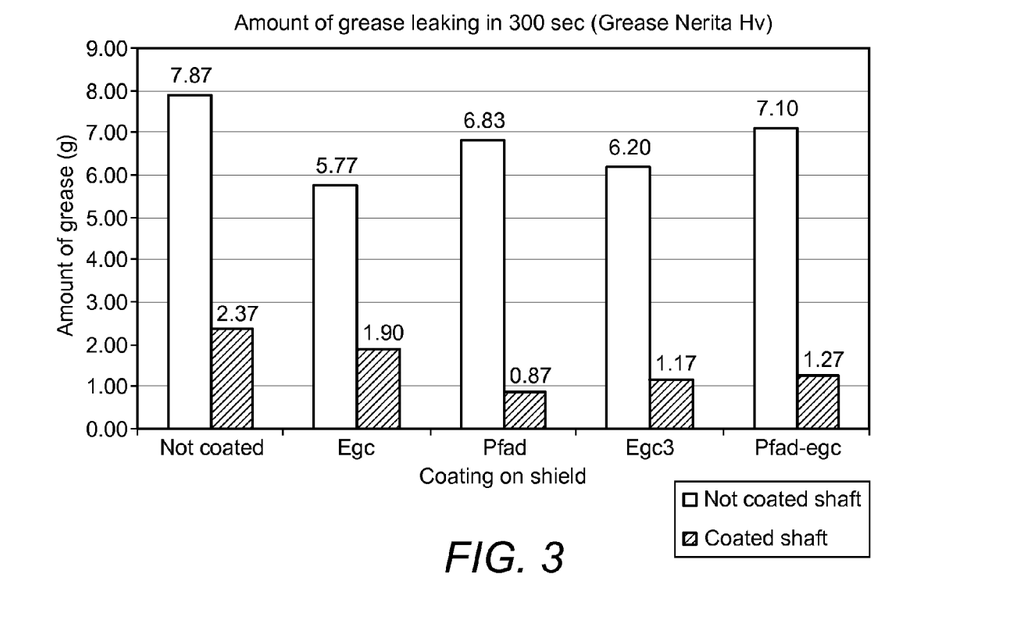
FIG. 3 shows a plot of grease leakage for bearings according to the present invention and also rolling element bearings according to comparative examples.
Figure 4:
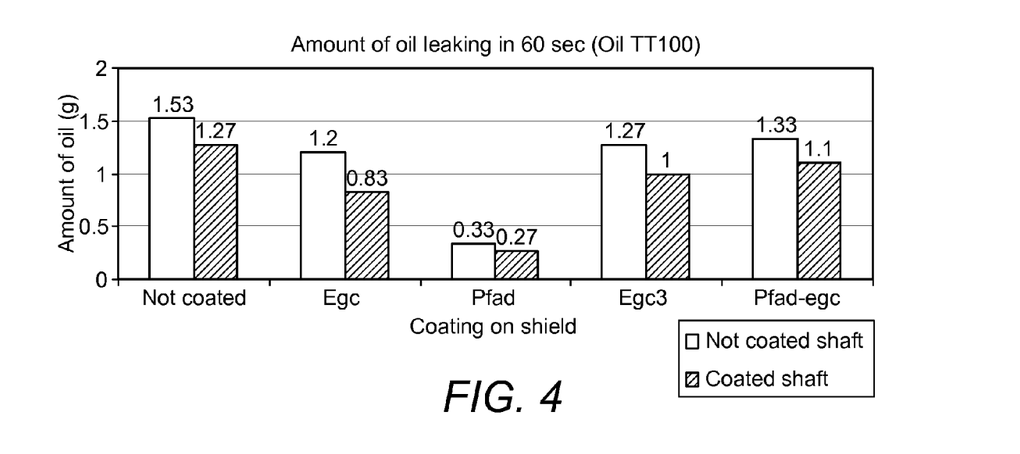
FIG. 4 shows a plot of grease leakage for bearings according to the present invention and also rolling element bearings according to comparative examples.

The results are summarised in FIGS. 2, 3 and 4. FIG. 2 shows the amount of grease (MT33) in grams that leaked from the bearings in 300 seconds. "Egc" refers to EGC 2702, "Pfad" refers to PFAD 335D, "Egc3" refers to 3 layers of EGC 2702, and "Pfad-egc" refers to a first layer of PFAD 335D and a top layer of EGC2702. FIG. 3 shows the amount of grease (Nerita HV) in grams that leaked from the bearings in 300 seconds. FIG. 4 shows the amount of grease (TT100) in grams that leaked from the bearings in 60 seconds.

According to the test results, coated shields can reduce grease and oil leakage significantly. The effect was much more pronounced if the shaft was also coated (darker column in the Figures). More layers of coating did not improve the effect. The strongest effects are summarised in Table 3, in which 77 to 89% improvement on grease leakage can be achieved by the oleophobic coatings.

TABLE 3

Pearl IV grease leakage test result summary with oleophobic coated shields and shaft
(*Reduction of grease leakage is calculated as (grease leakage standard bearing − grease leakage coated bearing)/grease leakage standard bearing %).

| | MT33 grease | Nerita HV grease | TT 100 oil |
|---|---|---|---|
| Coated shield | EGC 2702 | EGC2702 | PFAD 335D |
| Reduction of grease leakage* | 64% | 27% | 78% |
| Coated shield/coated shaft | EGC2702/ EGC2702 | PFAD/EGC2702 | PFAD/EGC2702 |
| Reduction of grease leakage* | 77% | 89% | 82% |

The foregoing detailed description has been provided by way of explanation and illustration, and is not intended to limit the scope of the appended claims. Many variations in the presently preferred embodiments illustrated herein will be apparent to one of ordinary skill in the art, and remain within the scope of the appended claims and their equivalents.

The invention claimed is:

1. A rolling element bearing comprising:
an inner ring;
an outer ring;
a plurality of rolling elements disposed between an outer surface of the inner ring and an inner surface of the outer ring;
a bearing shield assembly comprising a first member having an annular surface that faces the plurality of rolling elements, the first member either extending from the inner ring towards the outer ring to define a gap between the first member and the outer ring, or extending from the outer ring towards the inner ring to define a gap between the first member and the inner ring; and
a first coating containing at least one of a fluorocarbon and a silicone, the first coating covering at least a portion of the first member adjacent the gap and forming a first low surface energy surface adjacent the gap;
wherein the bearing has a configuration of one of:
(1) in a configuration where the first member extends from the inner ring, the outer ring has a second coating that contains at least one of a fluorocarbon and a silicone and forms a second low surface energy surface adjacent the gap, or
(2) in a configuration where the first member extends from the outer ring, the inner ring has a second coating that contains at least one of a fluorocarbon and a silicone and forms a second low surface energy surface adjacent the gap;
the first and second low surface energy surfaces each have a surface energy of ≤0.028 N/m;
the first coating has a thickness of 0.2 to 10.5 μm;
the second coating has a thickness of 0.2 to 0.5 μm; and
wherein the bearing is loaded with MT33 grease to lubricate motion of the rolling elements relative to the outer surface of the inner ring and the inner surface of the outer ring, and the first coating and the second coating are each comprised of EGC 2702 having a thickness of 0.2-0.5 μm.

2. The bearing of claim 1, wherein the bearing shield assembly further comprises a second member having an annular surface that faces the plurality of rolling elements and that extends from the inner ring towards the outer ring to define a gap between the second member and the outer ring, or from the outer ring towards the inner ring to define a gap between the second member and the inner ring, the first and second members located either side of the rolling elements, and wherein:
the second member has the first coating containing at least one of a fluorocarbon and a silicone and forming a third low surface energy surface adjacent the gap;
the bearing has a configuration of one of:
(1) in a configuration where the second member extends from the inner ring, the outer ring has the second coating that contains at least one of a fluorocarbon and a silicone and forms a fourth low surface energy surface adjacent the gap between the second member and the outer ring, or
(2) in a configuration where the second member extends from the outer ring, the inner ring has the second coating that contains at least one of a fluorocarbon and a silicone and forms a fourth low surface energy surface adjacent the gap between the second member and the inner ring; and
the third and fourth low surface energy surfaces each have a surface energy of ≤0.028 N/m.

3. The bearing of claim 2, wherein at least one of the first member and the second member extends from the outer ring towards the inner ring.

4. The bearing of claim 2, wherein at least a portion of the annular surface of at least one of the first member and the second member has the first or the third low surface energy surface having a surface energy of ≤0.028 N/m.

5. The bearing of claim 1, wherein the bearing is a deep groove ball bearing.

6. A rolling element bearing comprising:
an inner ring;
an outer ring;
a plurality of rolling elements disposed between an outer surface of the inner ring and an inner surface of the outer ring;
a bearing shield assembly comprising a first member having an annular surface that faces the plurality of rolling elements, the first member either extending from the inner ring towards the outer ring to define a gap between the first member and the outer ring, or extending from the outer ring towards the inner ring to define a gap between the first member and the inner ring; and
a first coating containing at least one of a fluorocarbon and a silicone, the first coating covering at least a portion of the first member adjacent the gap and forming a first low surface energy surface adjacent the gap;
wherein the bearing has a configuration of one of:
(1) in a configuration where the first member extends from the inner ring, the outer ring has a second coating that contains at least one of a fluorocarbon and a silicone and forms a second low surface energy surface adjacent the gap, or
(2) in a configuration where the first member extends from the outer ring, the inner ring has a second coating that contains at least one of a fluorocarbon and a silicone and forms a second low surface energy surface adjacent the gap;
the first and second low surface energy surfaces each have a surface energy of ≤0.028 N/m;
the first coating has a thickness of 0.2 to 10.5 μm;
the second coating has a thickness of 0.2 to 0.5 μm; and
wherein the bearing is loaded with Nerita HV grease to lubricate motion of the rolling elements relative to the outer surface of the inner ring and the inner surface of the outer ring, the first coating is comprised of PFAD 335D having a thickness of 5-10 μm, and the second coating is comprised of EGC 2702 having a thickness of 0.2-0.5 μm.

7. A rolling element bearing comprising:
an inner ring;
an outer ring;
a plurality of rolling elements disposed between an outer surface of the inner ring and an inner surface of the outer ring;
a bearing shield assembly comprising a first member having an annular surface that faces the plurality of rolling elements, the first member either extending from the inner ring towards the outer ring to define a gap between the first member and the outer ring, or extending from the outer ring towards the inner ring to define a gap between the first member and the inner ring; and a first coating containing at least one of a fluorocarbon and a silicone, the first coating covering at least a portion of the first member adjacent the gap and forming a first low surface energy surface adjacent the gap;

wherein the bearing has a configuration of one of:

(1) in a configuration where the first member extends from the inner ring, the outer ring has a second coating that contains at least one of a fluorocarbon and a silicone and forms a second low surface energy surface adjacent the gap, or (2) in a configuration where the first member extends from the outer ring, the inner ring has a second coating that contains at least one of a fluorocarbon and a silicone and forms a second low surface energy surface adjacent the gap;

the first and second low surface energy surfaces each have a surface energy of ≤0.028 N/m;

the first coating has a thickness of 0.2 to 10.5 μm;

the second coating has a thickness of 0.2 to 0.5 μm; and wherein the bearing is loaded with TT 100 base oil to lubricate motion of the rolling elements relative to the outer surface of the inner ring and the inner surface of the outer ring, the first coating is comprised of PFAD 335D having a thickness of 5-10 μm, and the second coating is comprised of EGC 2702 having a thickness of 0.2-0.5 μm.

* * * * *